United States Patent
Ilbery

[19]

[11] Patent Number: 6,108,452
[45] Date of Patent: Aug. 22, 2000

[54] GEOMETRICALLY REDUCING MASK ERROR DIFFUSION

[75] Inventor: Peter William Mitchell Ilbery, Dundas, Australia

[73] Assignees: Canon Information Systems Research Australia Pty Ltd.; Canon Aptex Inc., both of North Ryde, Australia

[21] Appl. No.: 08/779,357

[22] Filed: Jan. 6, 1997

[30] Foreign Application Priority Data

Jan. 5, 1996 [AU] Australia .................................. PN7413

[51] Int. Cl.[7] .................................................. G06K 9/46
[52] U.S. Cl. .......................... 382/252; 358/448; 358/456
[58] Field of Search .................................. 382/251, 252, 382/232, 237; 358/448, 455, 456, 457, 458, 447

[56] References Cited

U.S. PATENT DOCUMENTS

| 4,339,774 | 7/1982 | Temple | 358/283 |
|---|---|---|---|
| 5,353,127 | 10/1994 | Shiau et al. | 358/458 |

FOREIGN PATENT DOCUMENTS

| 0690612 | 1/1996 | European Pat. Off. | H04N 1/405 |
| WO | | | |
| 8807306A | 9/1988 | WIPO | H04N 1/40 |
| WO | | | |
| 8906080A | 6/1989 | WIPO | H04N 1/40 |

OTHER PUBLICATIONS

"Halftoning Techniques Using Error Correction", G.S. Fawcett et al., Proceedings of the Society for Information Display (SID), vol. 27, No. 4, 1986, New York (US), pp. 305–308, XP000002353.

"An adaptive algorithm for Spatial Greyscale" R.W. Floyd et al., Society for Information Display 1975, Symposium Digest of Technical Papers, 1975, pp. 75–77.

"Digital Halftoning", Robert Ulichney, MIT Press, 1991.

*Primary Examiner*—Thomas D. Lee
*Attorney, Agent, or Firm*—Fitzpatrick, Cella, Harper & Scinto

[57] ABSTRACT

An image processing system in which a computer image is halftoned by halftoning a current pixel using error diffusion, with a halftoned output value of the current pixel being determined using errors derived from substantially all previously halftoned pixels of the image. Output error values are determined for each pixel, and are acted upon by an error diffusion mask of geometrically reducing values. In certain instances, previously halftoned pixels are divided into two or more groups to obtain a desired contribution from previously halftoned pixels.

14 Claims, 9 Drawing Sheets

GEOMETRICALLY REDUCING MASK ERROR DIFFUSION

FIELD OF THE INVENTION

The present invention relates to the field of digital image processing and more particularly to apparatus and method for digital halftoning continuous tone images using error diffusion.

BACKGROUND ART

Digital halftoning is a technique used in image processing to produce a halftone output image from a continuous tone input image. In order to halftone a colour image, a continuous tone colour image is sampled, for example with a scanner, and the samples are then digitised and stored in a computer device. In a full colour system, the digitised samples, or pixels, can consist of independent binary representations of the colour components of an image. For example, in the well known red, green and blue system (RGB) utilised in most output displays, the digitised samples or pixels consist of binary representations of the red, green and blue scanned colour values respectively. These binary representations typically range from 0 to 255 for each colour, thereby comprising 8 bits for each primary colour, or 24 bits to represent one pixel. Another colour system involves cyan, magenta, yellow and black (CMYK) and is used predominantly in printer output devices.

Standard cathode ray tube (CRT) type display devices are able to display each pixel with a large number of variations of each colour component of the pixel, giving rise to the desirability of storing 256 possible values for each colour component of each pixel of a CRT type display. Other output devices however, such as printers and certain display devices such as ferro-electric liquid crystal displays are often designed to only be able to display a limited number of colours or intensity values for each output colour Hence, when displaying an image on such devices, it is necessary to create the sensation of multilevel colours by suitably distributing the possible output colours in the output image. By way of example, as shown in FIG. 1, it can be assumed that each pixel 1 of a first example display device is able to display red. green, and blue colour values RGB), with each colour value taking a totally "on" or totally "off" state.

Therefore each colour component value can display one of two colours and the total number of colours which can be displayed by such a pixel will be 2×2×2=8 colours, A second illustrative example is that of a black and white raster display device wherein each pixel can display one of two colours, with black or white.

As shown in FIG. 2 it is desired to display a stored input image 2 on a display device 3 where each pixel of the display device 3 can only display a restricted number of colours. In such cases, it is necessary to utilise a halftoning process 4 so as to convert the input image 2 to a form readily displayable on the display device 3 The halftoning process 4 that is actually performed can include dithering or error diffusion.

One error diffusion process can be explained with reference to FIG. 3, for example with respect to the display of monochrome images. In a monochrome system, each pixel of an array 7 of pixels can display either black (off) or white (on). Assuming that the input image has 256 possible levels of display, a decision must be taken whether to display an on or an off value. In FIG. 4, an output (halftone) value of 0 (or off) is displayed when a derived input value, being the sum of the input value and portions of error values of previously processed pixels, is less than or equal to 127, and and an output value of 1 (or on) is displayed when the derived input value is greater than or equal to 128, An error output value $e_{ij}$ for a current pixel 6 being displayed is derived, the error value being the difference between the derived input value and the chosen halftone value. As illustrated in FIG. 3, portions of the error value $e_{ij}$ are then distributed amongst the surrounding pixels which have not, as yet, been processed. FIG. 3 shows one scheme for distributing the error whereby two eighths of the error is added to the value of pixel 8, one eighth is added to the pixel 9, one eighth is added to the pixel 10, two eights is added to the pixel 11, one eighth is added to the pixel 12, and one eighth is added to the pixel 13. This has the effect of spreading, or diffusing, the error over several pixels in the output image.

With respect to colour display devices, error diffusion of a full colour image can be performed by error diffusing each output colour independently.

One deficiency of error diffusion is that it becomes inaccurate at very low and very high intensity values of the input image. This can result in clearly noticeable image degradation not visually evident at locations where the intensity of the input image is of a median type value.

SUMMARY OF THE INVENTION

In accordance with an aspect of the present invention, there is disclosed a method of error diffusing an image, the image having a plurality of scan lines each having a plurality of pixels, the method comprising, for each of the pixels, the steps of:

applying an error diffusion mask to determine an input error value for the pixel wherein the error diffusion mask comprises error diffusion coefficients corresponding to substantially all previously error diffused pixels of the image; and determining an output pixel value and an output error value of the pixel from the input error value and an input pixel value of the pixel.

In accordance with another aspect of the present invention there is disclosed a method of halftoning an image, the image comprising a plurality of pixels arranged in scan lines, the method comprising the step of error diffusing each pixel of the image characterised in that a halftoned output value of the pixel is determined from error values obtained from substantially all previously halftoned pixels of the image. Preferably the method comprises, for a current pixel of the image, the specific steps of:

(a) receiving an input pixel value of the current pixel:

(b) determining a derived input value of the current pixel by summing the input pixel value with an input error value, wherein the input error value is determined from output error values of substantially all pixels of the image that preceded the current pixel:

(c) using the derived input value to determine a halftoned output value of the current pixel; and (d) determining an output error value of the current pixel by subtracting the halftoned output value from the derived input value.

Typically, step (c) comprises selecting a closest one of a plurality of output values to the derived input value and outputting for display the selected value as the halftoned output value. Generally the input error value is determined by applying an error diffusion mask to output error values of substantially all of the preceding pixels, the mask having error diffusion coefficients corresponding to each of the substantially all preceding pixels. Advantageously the error diffusion mask comprises at least one two-dimensional array of error diffusion coefficients geometrically decreasing by a first predetermined ratio for each element of the array away from a first predetermined error diffusion coefficient in one dimension of the array and geometrically decreasing by a second predetermined ratio for each element of the array away from the lead position in the other dimension of the array. Typically the substantially all preceding pixels are divided into a plurality of groups of pixels and a corresponding mask is applied to each of the groups to provide a corresponding plurality of group error values, the group error values being summed to provide the input error value. Preferably, one or more of the groups comprise wedges of pixels that extend substantially radially from the current pixel.

In accordance with another aspect of the present invention there is disclosed apparatus for halftoning an image, the apparatus comprising:

receiving means for receiving input pixels of the image intended for display in raster scan order; and error diffusing means for error diffusing the input pixels to provide error diffused halftoned output pixels for display, wherein a halftoned output value of a current pixel of the image is determined from error values obtained from substantially all previously halftoned pixels of the image.

In accordance with another aspect of the present invention there is disclosed a computer software system for executing instructions on a general purpose computer, wherein the instructions comprise a plurality of process modules for halftoning an image, the image comprising a plurality of pixels arranged in a plurality of scan lines, the modules comprising:

first module for determining a derived input value of a current pixel of the image by summing an input pixel value of the current pixel with an input error value;

a second module for determining the input error value from output error values of substantially all pixels of the image preceding the current pixel;

a third module for determining a halftoned output value for the current pixel from the derived input value; and a fourth module for determining an output error value for the current pixel from the halftoned output value and the derived input value.

BRIEF DESCRIPTION OF THE DRAWINGS

A number of embodiments of the present invention will now be described with reference to the accompanying drawings in which.

DETAILED DESCRIPTION OF THE PREFERRED EMBODIMENTS

In the following description of the various embodiments it will be assumed, for simplicity, that an error diffusion process (to be hereinafter described) is applied to pixels on a pixel-by-pixel and line-by-line basis, consecutively in a forward direction from a top left-most pixel to a bottom right-most pixel of an image (ie. a raster scan manner). However, the error diffusion process hereinafter described is not limited to such an application. For example, the error diffusion process can be applied in a reverse direction from the bottom right-most pixel sequentially, from pixel-to-pixel, to the top left-most pixel of an image. Alternatively, the error diffusion process can be applied in the forward direction for every alternate line and in the reverse direction for each line intermediate to every alternate line of the image.

Figure 1:
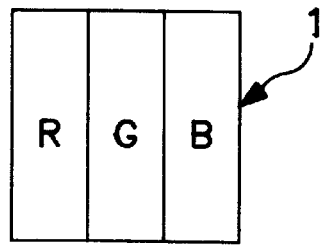
FIG. 1 illustrates an example pixel layout suitable for use with both the prior art and the preferred embodiment.
Figure 2:
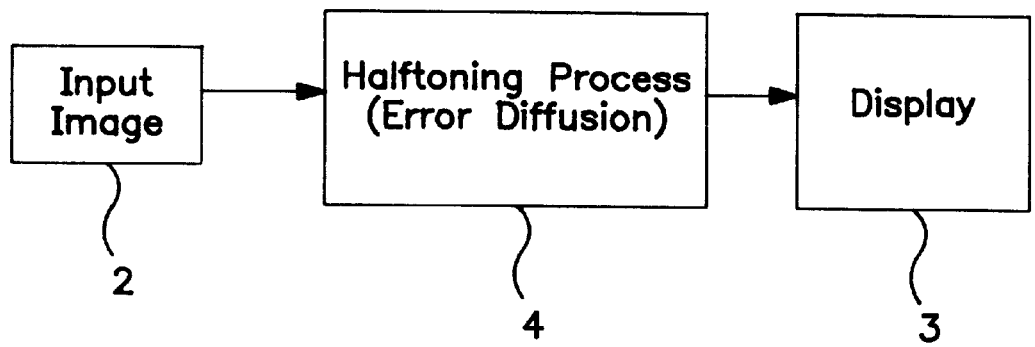
FIG. 2 is a schematic illustration of a halftoning system.

As described with reference to FIG. 1, it can be assumed, by way of example, that each pixel 1 of a display device is able to display red, green and blue colour values (RGB), with each colour taking on either a totally "on" or a totally "off" state, to produce in combination a pixel 1 able to display eight (8) possible colours. The error diffusion process of the various embodiments will be described with reference to the monochrome case with white being a totally "on" state and black being a totally "off" state. Such an error diffusion process applies equally and independently to each of the three colours (RGB) to produce on the display eight (8) colour combinations and a multiplicity of halftoned levels thereof.

Figure 5:
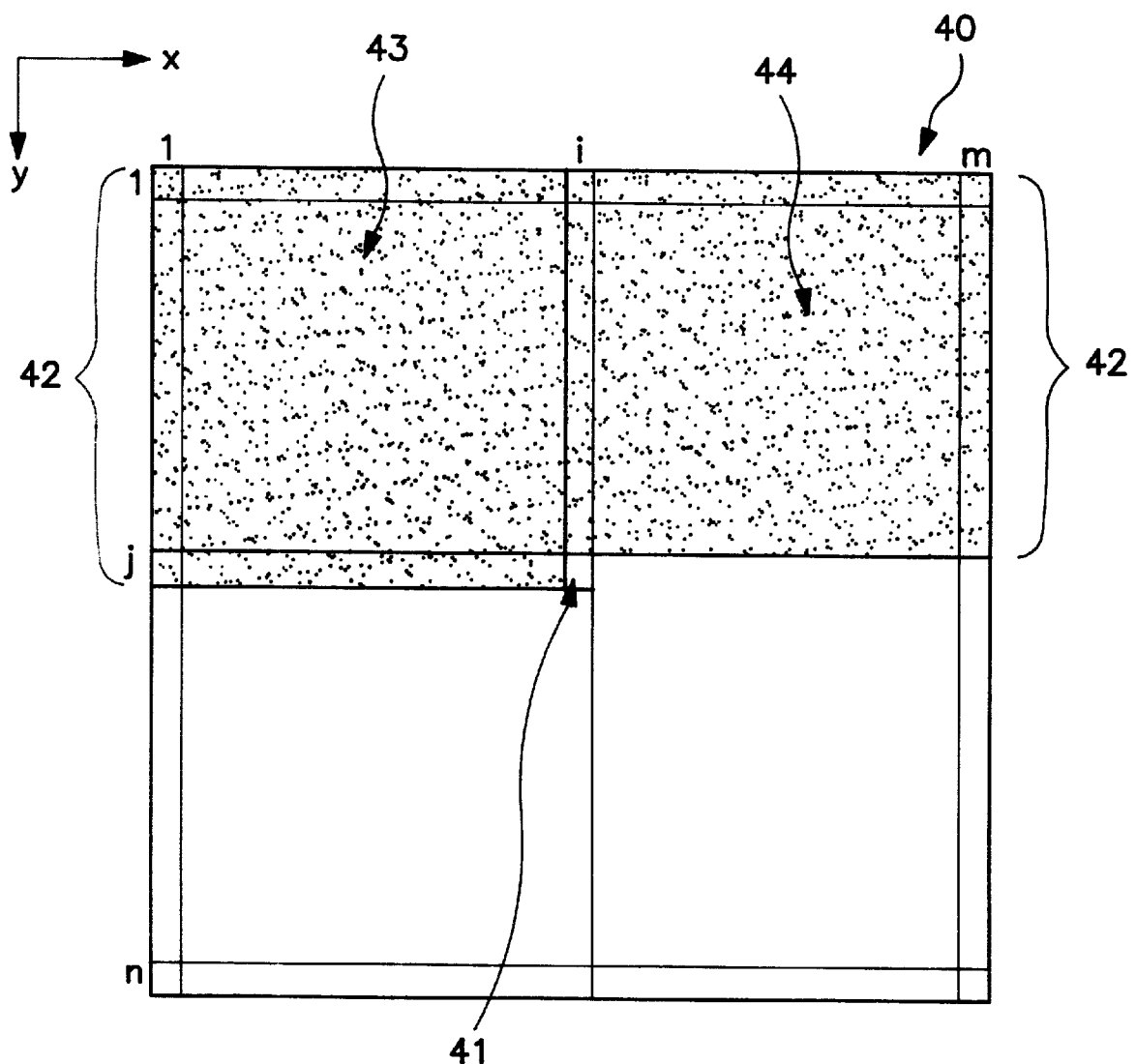
FIG. 5 illustrates an image error diffused to a current pixel in accordance with an embodiment of the present invention.

Referring now to FIG. 5 there is shown an image 40, where an output pixel value of a current pixel ($P_{i,j}$) 41 is to be determined. An upper left quadrant 43 and an upper right quadrant 44 of pixels of the image 40 whose output pixel values have been determined, are also illustrated. The upper left quadrant 43 comprises all pixels whose output value are known and are in an upper left region of the image 40 relative to the current pixel 41 (ie. pixel locations $1 \leq x \leq i-1$, $1 \leq y \leq j$). The upper right quadrant 44 comprises all pixels whose output value are known and are in an upper right region of the image 40 relative to the current pixel 41 including pixels on a current column (x=i) above the current pixel 41, but not including pixels on a current line (y=j), in which the current pixel 41 lies (ie. $i \leq x \leq m$, $1 \leq y \leq j-1$). It will be appreciated from FIG. 5, that for a display that is scanned in raster order, the "quadrants" mentioned above will not, in most instances, be representative of one quarter of the image 40. For example, for a current pixel on a first scan line (ie. j=1) of the image 40 there will be no upper right quadrant 44, and the upper left quadrant 43 will comprise only those pixels on the first scanline that have been halftoned. Similarly, for the first pixel of a last scan line (ie. x=1, y=n) of the image, there will be no upper left quadrant 43 and all pixels on all previous scanlines will be includes in the upper right quadrant 44. Accordingly, the term "quadrant" is used herein with some license to indicate an arbitrary area of previously halftoned pixels. Further, each of the quadrants 43 and 44 collectively identify all previously halftoned pixels 42 of the image 40.

Further, each of the halftoned pixels 42 has associated therewith an output pixel value and an output error value. For the current pixel 41, for example, an output error value is taken to be a difference between an derived input value of the current pixel 41, and a closest of possible output values of the current pixel 41, wherein the derived input value is a sum of an input value of the current pixel 41 and an input error value calculated as hereinafter described.

Figure 3:
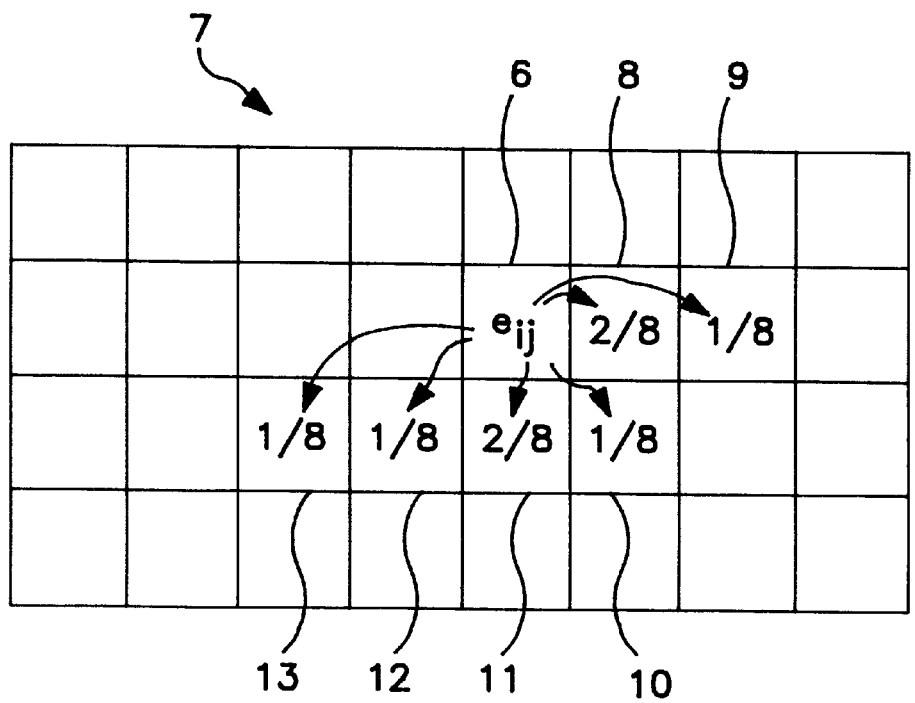
FIG. 3 illustrates a prior art error diffusion process that can be used in the system of FIG. 2.
Figure 4:
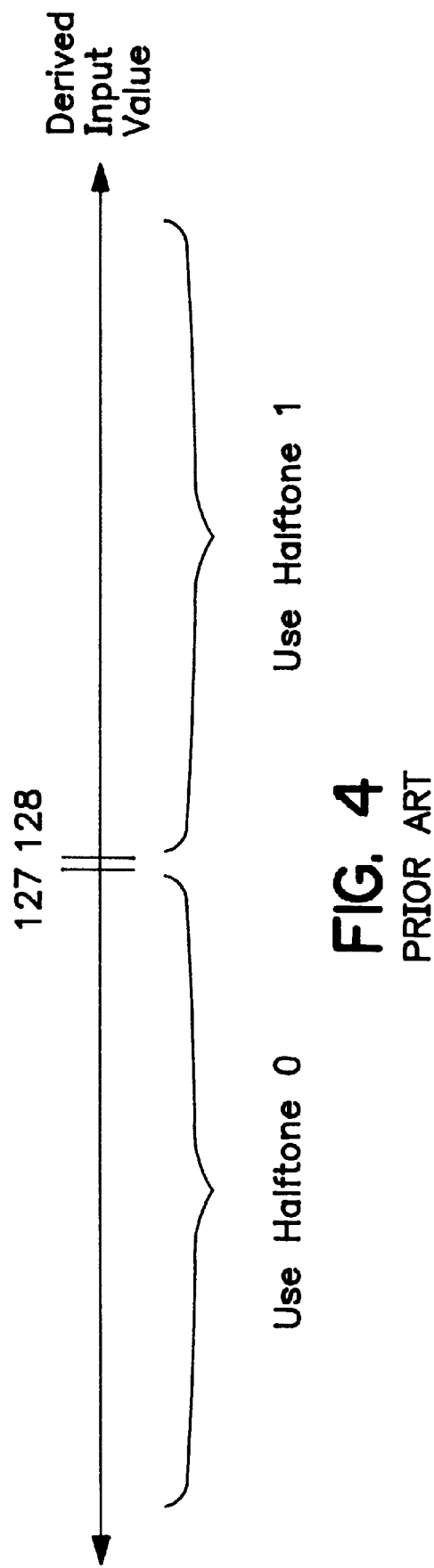
FIG. 4 depicts a thresholding process used in the prior art error diffusion process of FIG. 3.
Figure 6:
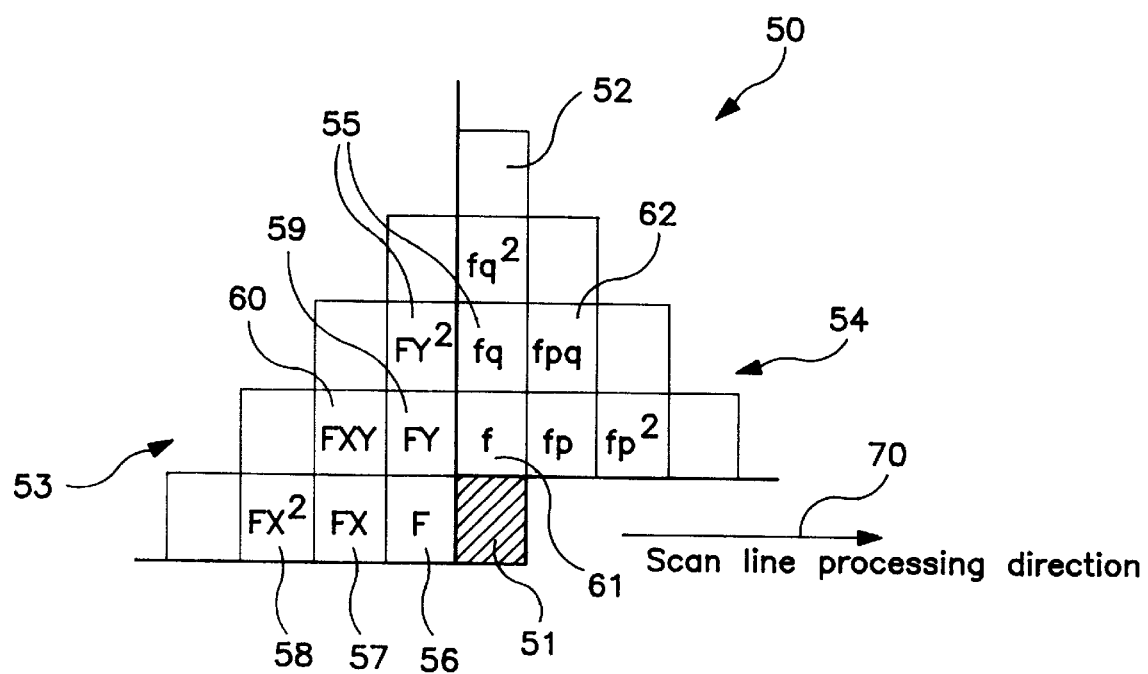
FIG. 6 illustrates an error diffusion mask having coefficients extending to all pixels already processed up to a current pixel.

Referring to FIG. 6, there is illustrated an error diffusion mask 50 according to one embodiment. A lead position 51 of the error diffusion mask 50 corresponds to an input error of the current pixel 41 being determined by the error diffusion process. Unlike the prior art error diffusion process described above, where an output error value for the current pixel is distributed as an input error to neighbouring pixels according to a limited extending error diffusion mask (see FIG. 3), the error diffusion mask 50 utilises output error values of substantially all halftoned pixels 42 processed prior to the current pixel 41 to determine an input error value for the current pixel 41.

Each entry position 52 of the error diffusion mask 50 corresponds to a pixel position of the halftoned pixels 42 of the image 40. Hence, entries in the upper left quadrant 53 of the error diffusion mask 50 correspond to the upper left quadrant 43 of halftoned pixels 42. Similarly, the upper right quadrant 54 entry positions of the error diffusion mask 50 correspond to each halftoned pixel 42 of the upper right quadrant 44 pixels. At each entry position 52, a coefficient 55 represents that fraction of the output error associated with a halftoned pixel which is to be distributed as an input error to the current pixel 41. These coefficients shall be referred to hereinafter as error diffusion coefficients, wherein an array of these coefficients form the entries of the error diffusion mask 50.

Preferably, the upper left quadrant 53 entries and the upper right quadrant 54 entries have predetermined initial coefficients 56 and 61 at a first entry position of each quadrant 53 and 54, respectively, adjacent to the lead position 51.

The error diffusion coefficients 55 reduce in value, preferably, as a geometric sequence for each position entry away from the first entry position of each quadrant 53 and 54. This is illustrated in FIG. 6 and shall be further explained as follows with reference to the upper left quadrant 53 of the error diffusion mask 50.

The upper left quadrant 53 of the error diffusion mask 50 forms an array of coefficients with a first coefficient being the initial coefficient 56 located in the first column, first row of the array and takes on a predetermined value "F". A second coefficient 57 of the upper left quadrant 53 located in the second column and first row of the array takes on a value equal to the first coefficient multiplied by a first predetermined ratio "X" (ie. FX). A third coefficient 58 located in the third column, first row of the array takes on the value of the second coefficient multiplied by the first predetermined ratio (ie. $FX^2$). Coefficients on the second row of the upper left quadrant 53 take on the values equal to the coefficients in the first row multiplied by a second predetermined ratio "Y". Coefficients on the third row take on values equal to the coefficients in the second row multiplied by the second predetermined ratio. In this manner, a coefficient of the upper left quadrant 53 of the error diffusion mask 50 located "m" columns and "n" rows away from the first coefficient of the upper left quadrant 53 take on a value equal to the first coefficient multiplied by the first predetermined ratio raised to the power of "m" and further multiplied by the second predetermined ratio raised to the power of "n" (ie. $FX^mY^n$). For example, a coefficient 60 located one column, one row away from the first column, first row take a value equal to FXY.

In a substantially similar manner, all error diffusion coefficients of the upper right quadrant 54 of the error diffusion mask 50 can be determined, wherein a first right coefficient 61 being the entry of the mask 50 above the lead position 51 takes on a corresponding predetermined factor "f". Other coefficients of the upper right quadrant 54 are determined utilizing a third predetermined ratio "p" for each coefficient to the right of the lead position 51 and utilizing a fourth predetermined ratio "q" for each coefficient above the first right coefficient to form, for example, a coefficient value 62 of "fpq" for the position entry of the mask 50 two places above and one place to the right of the lead position 51.

Figure 7:
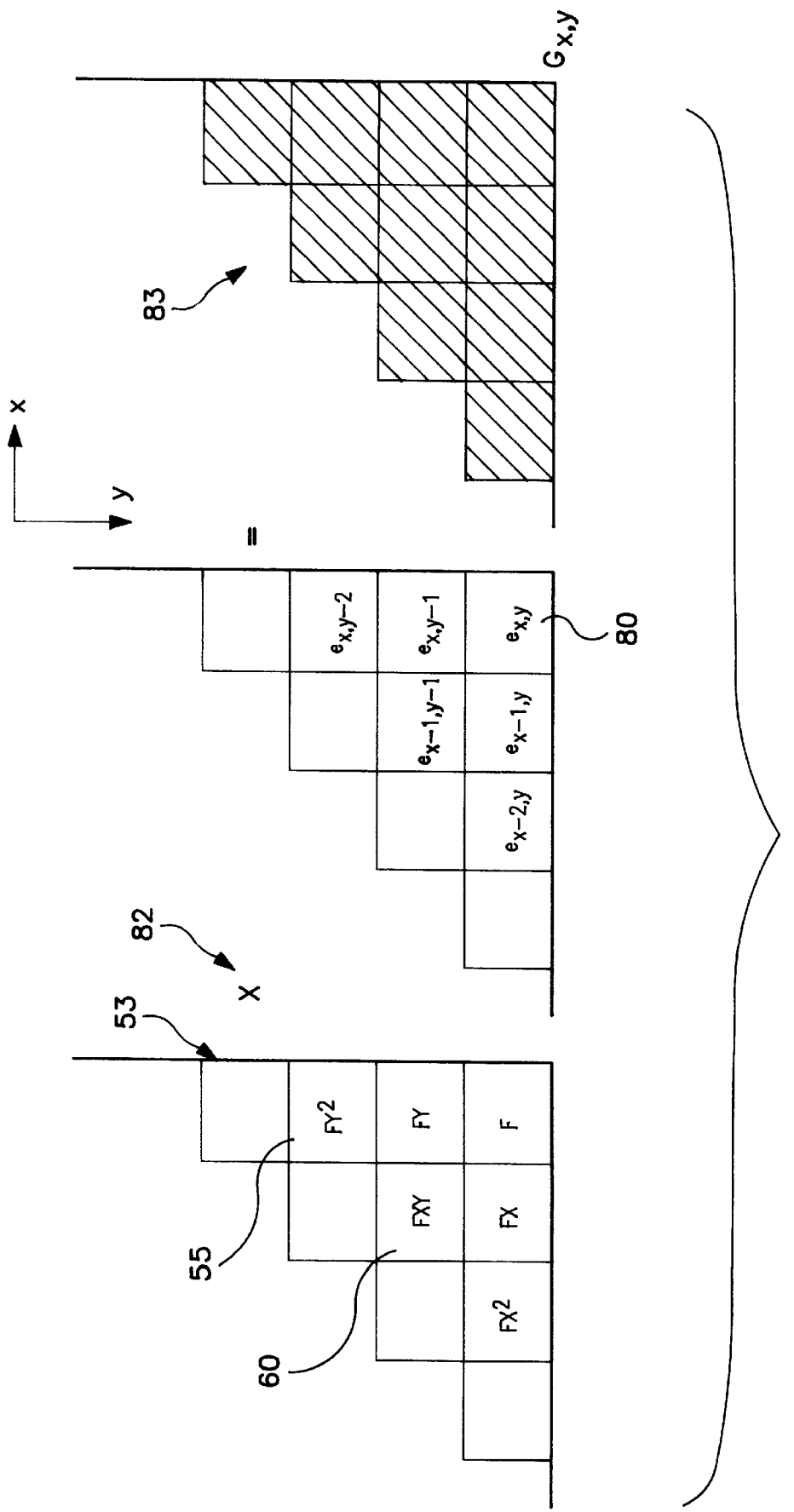
FIG. 7 illustrates one quadrant of an error diffusion mask applied to a corresponding region of pixels having an associated output error for each pixel.

FIG. 7 relates to a first method of determining the input error contribution and shows the coefficients 55 of upper left quadrant 53 of the error diffusion mask 50 of FIG. 6, and output error values 80 "$e_{x,y}$" associated with the upper left quadrant 43 of the halftoned pixels 42 of FIG. 5. Each error diffusion coefficient 55 is multiplied (indicated by operator 82) by each corresponding entry of the output error values 80, and summed over all output error values 80 to determine an input error contribution 83 to the current pixel value 41 by the upper left quadrant 43 of halftoned pixels 42. For example, the input error contribution 83 ($G_{x,y}$) to the current pixel 41 by the output error values associated with the upper left quadrant 43 of halftoned pixels 42 is given by:

$$G_{x,y} = Fe_{x,y} + FXe_{x-1,y} + FX^2e_{x-2,y} + \ldots + FYe_{x,y-1} + FXYe_{x-1,y-1} + \ldots + FY^2e_{x,y-2} + \ldots \quad \text{(EQ. 1)}$$

Preferably, the sum of all error diffusion coefficients form a geometrically decreasing series convergent to a single value and the values of the first predetermined ratio "X", the second predetermined ratio "Y" and the third and fourth predetermined ratios "p" and "q" respectively take on values between negative one (−1) and one (1).

Similarly, an input error contribution to the current pixel 41 by output error values associated with the upper right quadrant 44 of halftoned pixel 42 of FIG. 5, is determined substantially as described above with reference to FIG. 7, utilizing the coefficients of the upper right quadrant 54 of the error diffusion mask 50 shown in FIG. 6.

Figure 8:
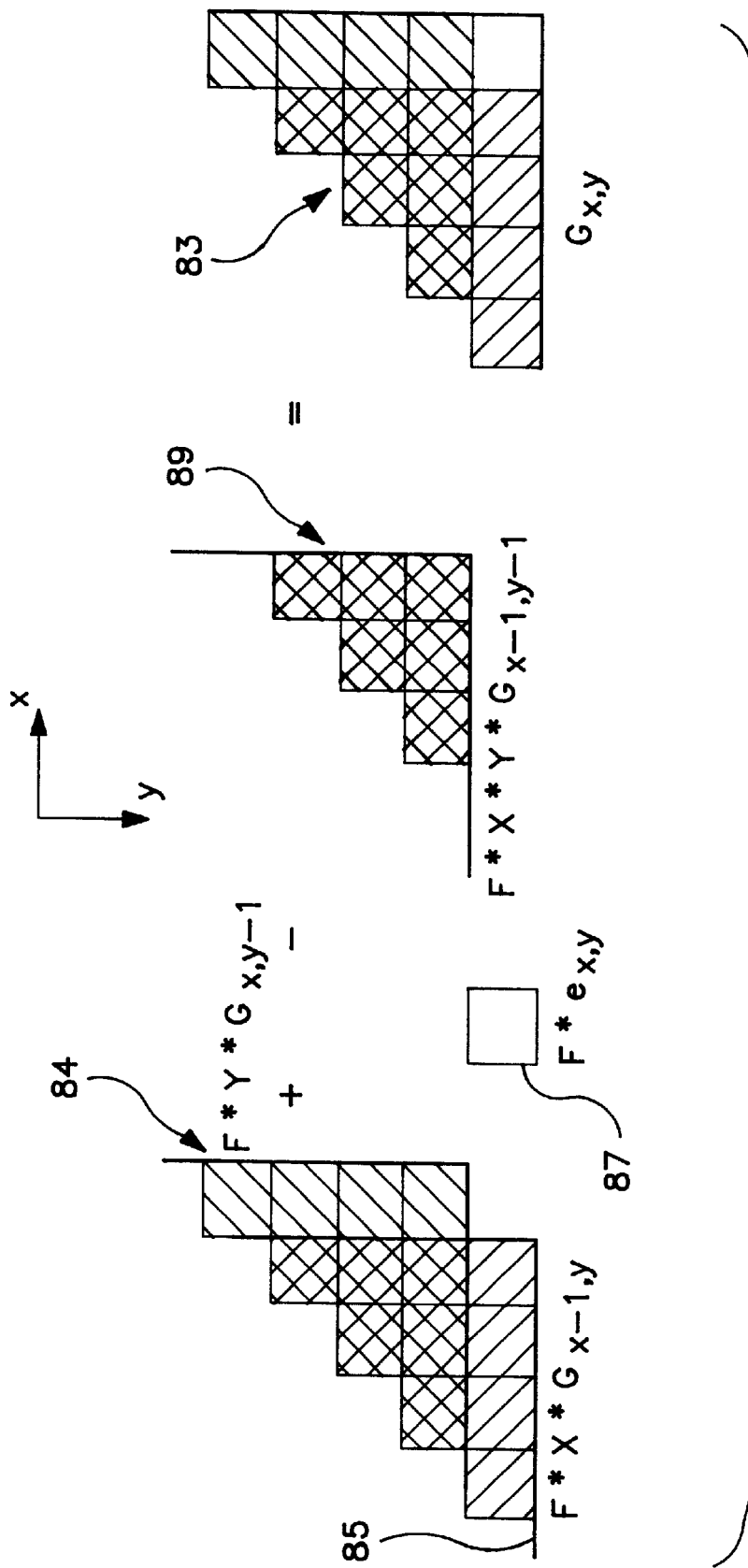
FIG. 8 shows a schematic representation of the step of determining a current input error value from a knowledge of adjacent pixel output error values in accordance with an embodiment of the present invention.

FIG. 8 relates to a second method where there is illustrated an iterative process for determining the input error value of the current pixel 41 from a knowledge of the input error values of only a few neighbouring halftoned pixels 42 To simplify the description of this iterative process, only the contribution from the output error values of upper left quadrant 43 of halftoned pixels 42, and the corresponding upper left quadrant 53 of error diffusion coefficients, is illustrated in FIG. 8. That is, only the input error contribution 83 by the upper left quadrant 43 of halftoned pixels 42 is shown in FIG. 8. From that, the input error contribution to the current pixel 41 by the upper right quadrant 44 of halftoned pixels 42 can be obtained in a substantially similar manner.

The input error contribution 83 of the current pixel 41 is determined from an input error contribution 84 from an upper left quadrant for a halftoned pixel immediately above the current pixel 41, an input error contribution 85 from an upper left quadrant for a halftoned pixel to the immediate left of the current pixel 41, the output error value of the halftoned pixel to the immediate left of the current pixel 41, and an input error contribution 89 from an upper left quadrant for a halftoned pixel one position up and one position to the left of the current pixel 41.

Hence, the input error contribution 83 to the current pixel 41 by the upper left quadrant 43 can be evaluated from the input error contributions of halftoned pixels 42 adjacent to the current pixel 41. The input error contribution 83 by the upper left quadrant of halftoned pixels 42 can be described by the following recursive equation:

$$G_{x,y}=F^{*}(e_{x,y}+X^{*}G_{x-1,y}+Y^{*}G_{x,y-1}-X^{*}Y^{*}G_{x-1,y-1}) \quad \text{(EQ. 2)}$$

where $G_{x,y}$ is the input error contribution 83 to a current pixel being at the "(x+1)" horizontal and "y" vertical pixel coordinate position measured from the top left corner of the image 40. "F" is the predetermined factor, "X" the first predetermined ratio and "Y" the second predetermined ratio as hereinbefore described.

The output error value "$e_{x,y}$" is the output error value of the "x,y" pixel coordinate position again measured from the top left corner of the image 40.

A substantially similar equation to that of Equation 2 is utilized in determining the input error contribution of the current pixel 41 from the halftoned pixels 42 belonging to the upper right quadrant 44.

For each of the respective methods of FIG. 7 or FIG, 8, the input error contribution from the upper left quadrant 43 and the upper right quadrant 44 of the current pixel 41 are preferably summed to form a total input error value for the current pixel 41.

An output value for the current pixel 41 is then determined from an input value of the current pixel 41 and the total input error value. For example, a sum value being the addition of the input value and the total error value is compared with a predetermined threshold value. If the sum value exceeds the predetermined threshold value, the current pixel 41 is placed in the totally "on" state (ie. the output value is assigned the value of the colour white). If the sum value does not exceed the predetermined threshold value, the current pixel 41 is placed in the totally "off" state (ie. the output value is assigned the value of the colour black).

Upon determining the output value for the current pixel 41, an output error value for tile current pixel 41 is determined as being the difference of the sum value and the output value for the current pixel 41.

Figure 9:
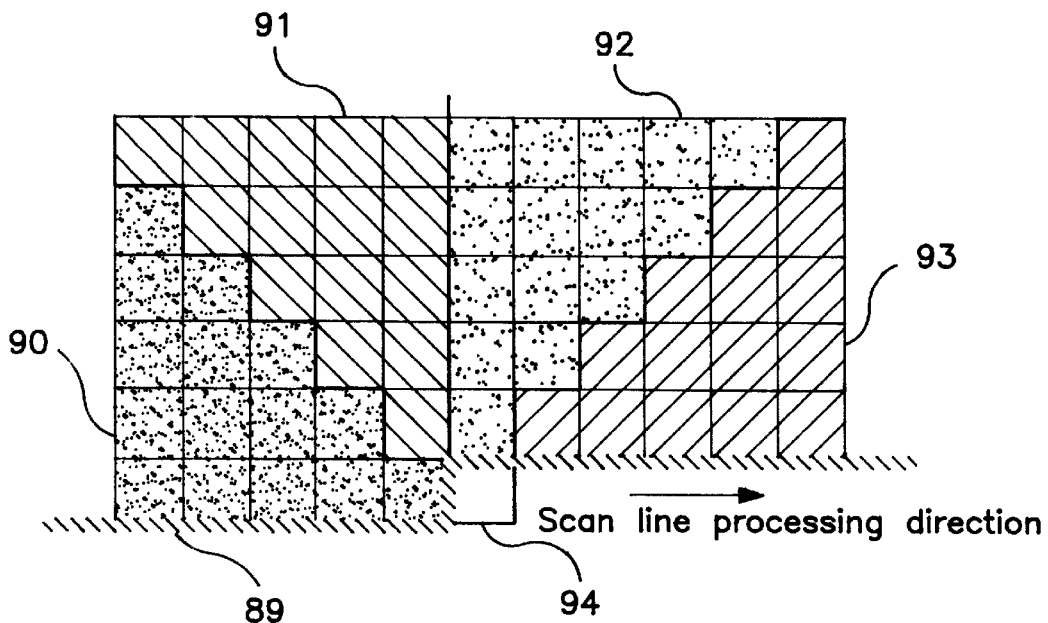
FIG. 9 depicts a further embodiment based upon dividing preceding portions of the image into wedges.

A further embodiment is described with reference to FIG. 9 where the previous two quadrants 43 and 44 of FIG. 5. are divided into four wedges 90, 91, 92, and 93 used for the error diffusing of a current pixel 94 and include all previously processed pixels above the broken line 89.

As with error diffusion using quadrant values, the present embodiment of error diffusion using wedge values, processes an image on a scanline-by-scanline basis, from the top of the image to the bottom. The processing for each scanline typically consists of a forward pass followed by a reverse pass of the same scanline illustrated in FIGS. 10 and 11. However, processing can also consist of a single pass per scanline.

Figure 10:
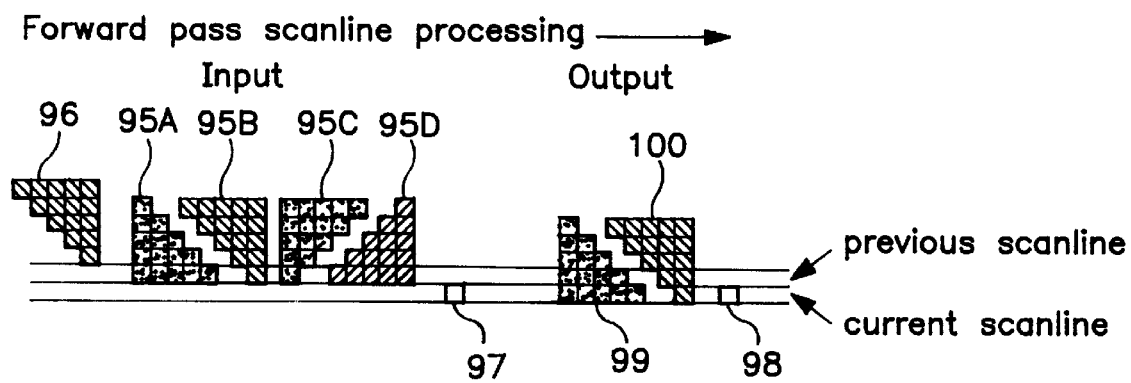
FIGS. 10 and 11 depict forward and reverse pass scanline processing in the embodiment of FIG. 9.

As seen in FIG. 10, in forward pass processing of a scanline, the input data consists of:
  wedge values 95A, 95B, 95C and 95D for the previous scanline,
  "top left" wedge values 96 for the line before the previous scanline: and
  input values 97 for pixels of the current scanline.
The calculated output data consists of:
  halftone output values, and error values 98 for pixels of the current scanline; and
  "bottom left" 99 and "top left" 100 wedge values for the current scanline.

Figure 11:
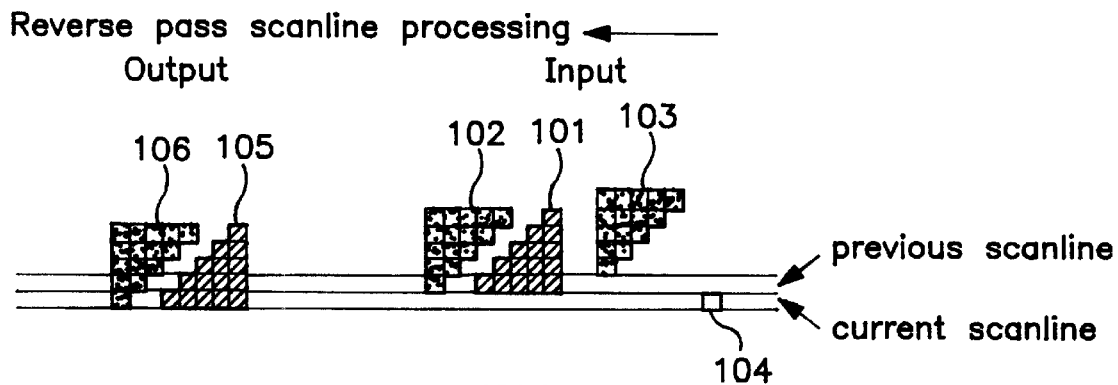

In the reverse processing of a scanline, depicted in FIG. 11, die input data consists of:
  "bottom right" 101 and "top right" 102 wedge values of the previous scanline:
  "top right" wedge values 103 for the line before the previous scanline; and
  error values 104 for the pixels of the current scanline.
The calculated output data consists of
  "bottom right" 105 and "top right" 106 wedge values for the current scanline.

Figure 12:
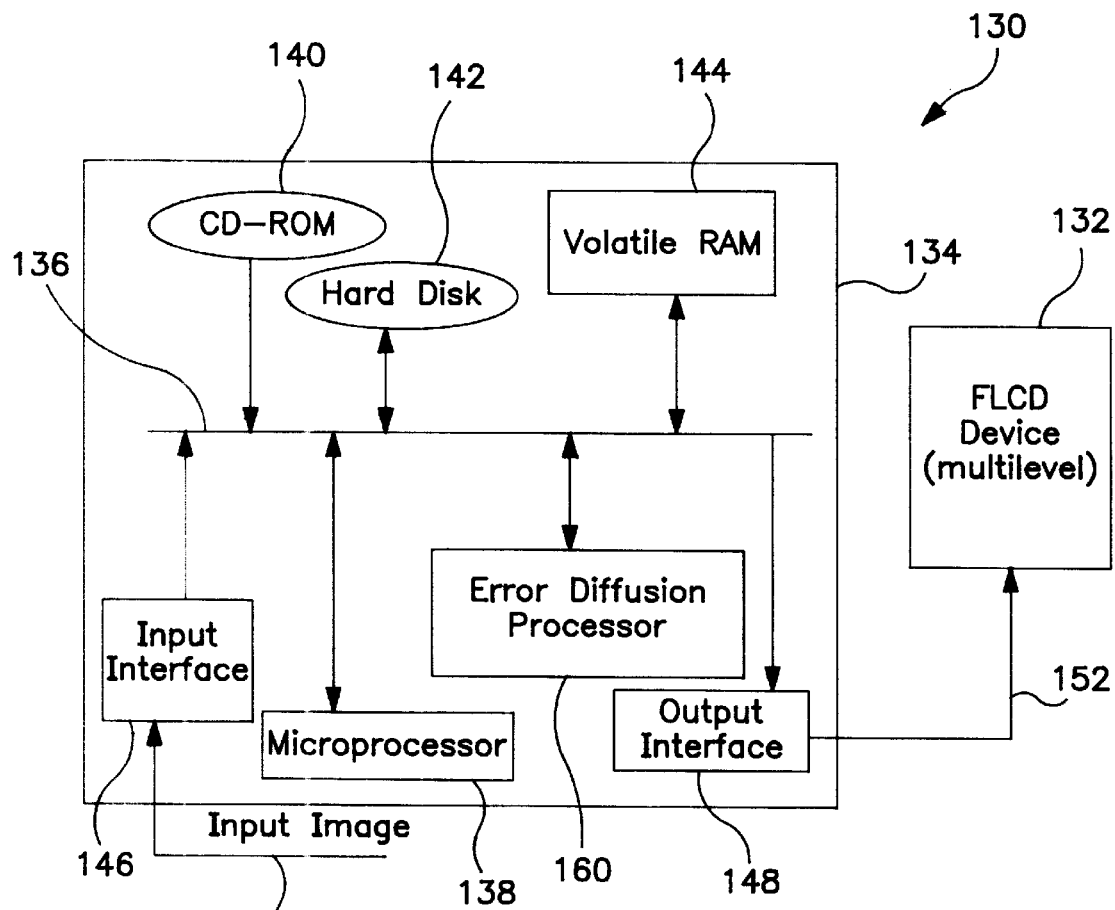
FIG. 12 depicts a computer system operable to perform error diffusion according to the described embodiments.

A specific arrangement is illustrated in FIG. 12 which shows a computer system 130 including a computer 134 having an output connected to an FLCD device 132. The computer 134 includes a system bus 136 to which a controlling microprocessor 138 is connected. The computer 134 incorporates a non-volatile random access memory (RAM) in the form of a hard disk 142 and also volatile RAM 144 which is typically formed by semiconductor components. A read only memory (ROM) device, such as a compact disc device (CD-ROM) 140 also connects to the bus to provide a source of information and controlling programs. Coupled to the bus 136 is an input interface 146 via which an input image can be provided via an input image line 150 to the computer 134. Also connected to the bus 136 is an output interface 148 which connects via a signal line 152 to the FLCD 132. In operation, either one of the CD-ROM 140 or hard disk 142 can incorporate a computer program configured to perform error diffusion in accordance an embodiment of the present invention. The computer program is generally loaded from either one of the CD-ROM 140 or the hard disk 142 into the RAM 144 to enable running of the program. An image to be halftoned by error diffusion can be supplied via the input image line 150 or from either one of the CD-ROM 140 or the hard disk 142. The microprocessor 138 can, via the program, perform error diffusion of the image. Depending upon the rate at which the computer program performs error diffusion, the error diffused image can be stored in a frame memory, comprising for example part of the volatile RAM 144 and, once the entire image has been halftoned, the entire image can be transferred to the output interface 148 for display on the FLCD 132. Alternatively, where processing speed permits the microprocessor 138 can perform the halftoning and via the output interface directly output halftoned pixel values to the FLCD 132 whilst using the RAM 144 as intermediate storage for the various error values and the like used in calculations described above.

An alternative arrangement is also seen in FIG. 12 where an optional error diffusion processor 160 connects to the bus 136 and which, under control of the microprocessor 138, is configured to perform specific error diffusion calculations and operations in hardware thus releasing the microprocessor 138 from complicated calculations and thus permitting it to perform other management operations necessary for the control of the system 130.

Arrangements such as those shown in FIG. 12 can be useful in computing and other applications where the image update time is not crucial to system performance.

However, particularly for the display of image sequences a software implementation of the present invention may not be sufficiently fast so as to achieve real-time image display (eg. 25 frames per second in the PAL colour system). Further, in some applications such as portable personal computers and the like, it is desirable that a practical implementation of the present invention be interchangeable with standard hardware used in such applications. Accordingly, incorporation of an embodiment of the invention into the discrete level display device is advantageous.

Figure 13:
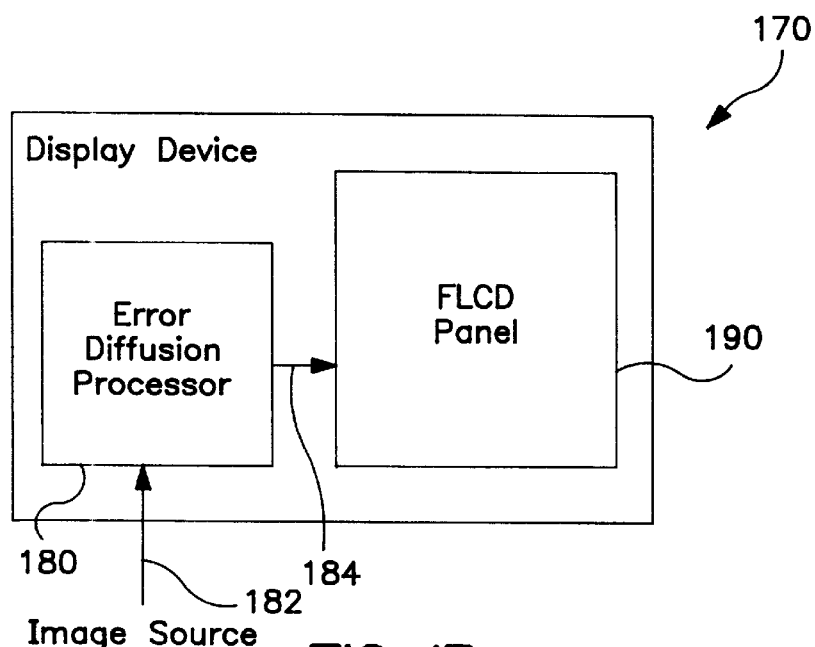
FIG. 13 depicts a display system operable according to the described embodiments.

FIG. 13 shows a display device 170 including an FLCD display panel 190 supplied with halftoned pixel data from an error diffusion processor 180. The processor 180 is input with (substantially continuous tone) pixel data on a line 182 derived from a suitable source of such data including a video device, such as a television receiver, or a general purpose computer, for example.

Figure 14:
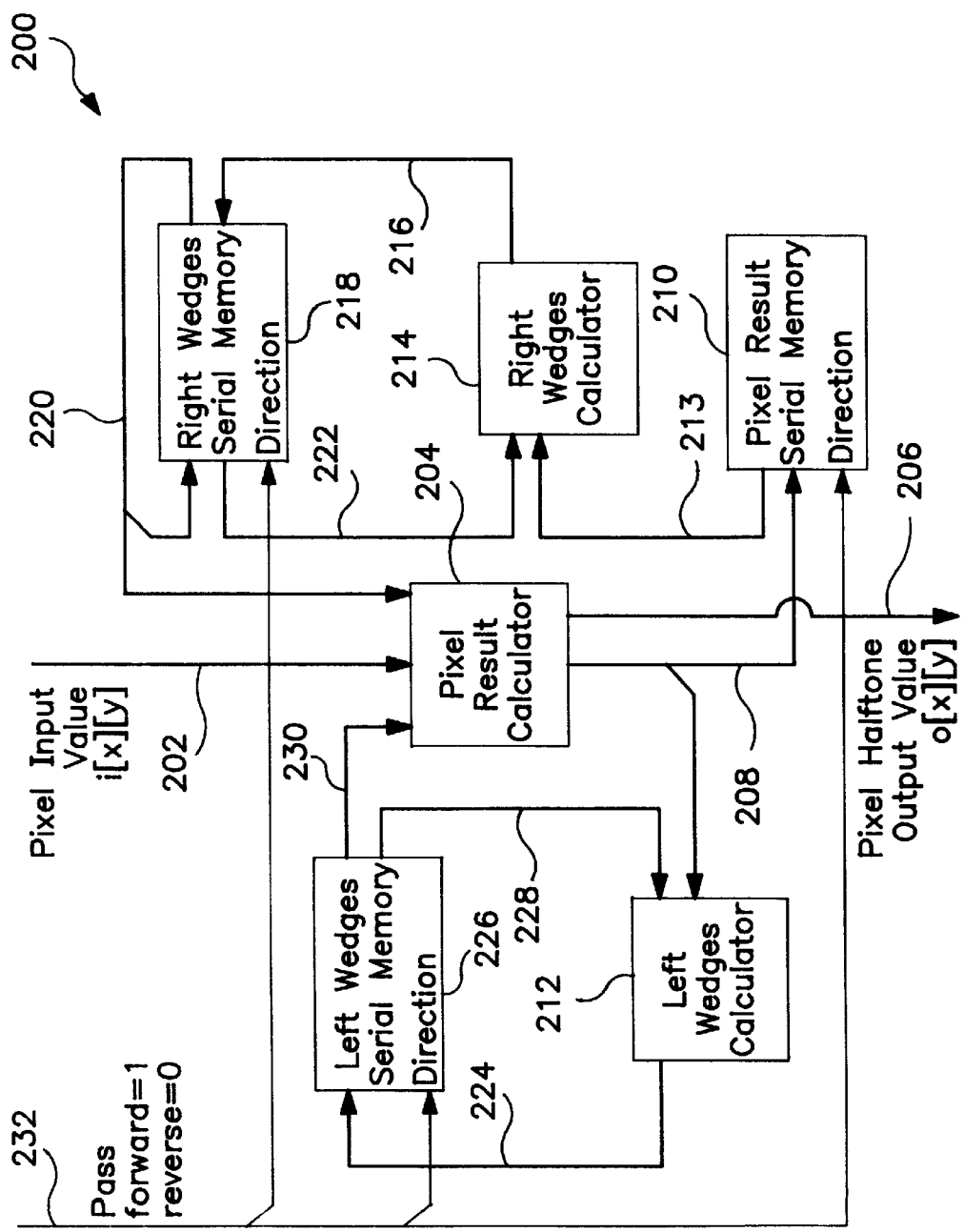
FIG. 14 is a schematic block diagram representation of an error diffusion processor according to one embodiment.

FIG. 14 illustrates an exemplary embodiment of an error diffusion processor 200, the general configuration of which can be applied to a number of the embodiments described above. In FIG. 14, a stream of pixel input values are supplied via a line 202 to a pixel result calculator 204. The calculator 204 provides a pixel halftone output value on a line 206, representing a display output of the processor 200. The calculator 204 also outputs pixel error values via a line 208 to a pixel result serial memory 210 and also to a left wedges calculator 212. The left wedges calculator 212 determines left wedge error values which are output on a line 224 to a left wedges serial memory 226. The memory 226 includes a return line 228 to the left wedges calculator 212 and an output line 230 to the pixel result calculator 204. The pixel result serial memory 210 includes an output on a line 213 that supplies an input to a right wedges calculator 214. The right wedges calculator 214 determines right wedge error values which are output on a line 216 to a right wedges serial memory 218. The serial memory 218 includes two outputs, a first output on a line 222 which supplies a further input of the right wedges calculator 219, and a second output on a line 220 which supplies both a further input of the right wedges serial memory 218 and also a further input of the pixel result calculator 204.

Each of the memories 210, 226 and 218 incorporate a "direction" input which is supplied with a signal on a line 232 representing the calculation direction being performed on the particular forward or reverse pass as noted above. When the signal on a line 232 is a logical 1 (forward pass), the left wedges serial memory 226 shifts from left to right, and both the right wedges serial memory 218 and the pixel result serial memory 210 shift from left to right. When the signal on a line 232 is a logical 0 (reverse pass), the left wedges serial memory 226 does not shift and both the right wedges serial memory 218 and the pixel result serial memory 210 shifts from right to left.

The processor 200 is advantageous in that its structure permits receipt of a serial pixel stream as input and provides a corresponding pixel output stream in a form ready for display and in reliance only upon a controlling forward/ reverse pass signal on a line 232. Further, each of the calculators 204, 212 and 218 can be configured in silicon at gate level thereby permitting real-time operation and hence the display of image sequences without any noticeable delay due to the halftoning process.

The foregoing describes only a number of embodiments of the present invention, and modifications, obvious to those skilled in the art, can be made thereto without departing from the scope of the present invention.

What is claimed is:

1. A method of error diffusing an image, the image having a plurality of scan lines each having a plurality of pixels, said method comprising, for each of said pixels, the steps of:

applying an error diffusion mask to an output error value of previously processed pixels to determine an input error value for said pixel wherein the error diffusion mask comprises error diffusion coefficients corresponding to all previously error diffused pixels of said image; and determining an output value and an output error value of said pixel, both said output pixel value and said output error value being dependent upon the input error value and an input pixel value of said pixel.

2. A method as claimed in claim 1, wherein said error diffusion mask comprises at least one two-dimensional array of error diffusion coefficients geometrically decreasing by a first predetermined ratio for each element of the array away from a first predetermined error diffusion coefficient in one dimension of the array and geometrically decreasing by a second predetermined ratio for each element of the array away from the first predetermined error diffusion coefficient in the other dimension of the array.

3. A method as claimed in claim 1, wherein each pixel is sequentially processed in consecutive scan lines in a raster-scan manner.

4. A method as claimed in claim 1, wherein each pixel is sequentially processed on each alternate scan line in one direction and sequentially processed on each intermediate alternate scan line in the opposite direction.

5. A method of halftoning an image, said image comprising a plurality of pixels arranged in scan lines, said method comprising the step of error diffusing each pixel of said image characterized in that a halftoned output value and an output error value of said pixel are determined from error values obtained from all previously halftoned pixels of said image, both said output pixel value and said output error value being defendant upon an input error value and an input pixel value of said pixel.

6. A method as claimed in claim 5, wherein said method comprises, for a current pixel of said image:

(a) receiving an input pixel value of said current pixel;

(b) determining a derived input value of said current pixel by summing said input pixel value with an input error value, wherein the input error value is determined from output error values of all pixels of said image that preceded said current pixel;

(c) using said derived input value to determine a halftoned output value of said current pixel; and (d) determining an output error value of said current pixel by subtracting said halftoned output value from said derived input value.

7. A method as claimed in claim 6, wherein said step (c) comprises selecting a closest one of a plurality of output values to said derived input value and outputting for display the selected value as said halftoned output value.

8. A method as claimed in claim 6, wherein said input error value is determined by applying an error diffusion mask to output error values of said substantially all of said preceding pixels, said mask having error diffusion coefficients corresponding to each of said substantially all preceding pixels.

9. A method as claimed in claim 8, wherein said error dimension mask comprises at least one two dimensional array of error diffusion coefficients geometrically decreasing by a first predetermined ratio for each element of the array away from a first predetermined error diffusion coefficient in one dimension of the array and geometrically decreasing by a second predetermined ratio for each element of the array away from the first predetermined error diffusion coefficient in the other dimension of the array.

10. A method as claimed in claim 8, wherein said substantially all preceding pixels are divided into a plurality of groups of pixels and a corresponding mask is applied to each of said groups to provide a corresponding plurality of group error values, said group error values being summed to provide said input error value.

11. A method as claimed in claim 8, wherein one or more of said groups comprise wedges of pixels that extend substantially radially from said current pixel.

12. Apparatus for halftoning an image, said apparatus comprising:

receiving means for receiving input pixels of said image intended for display in raster scan order, and error diffusing means for error diffusing said input pixels to provide error diffused halftoned output pixels for display and an output error value associated with each output pixel, wherein a halftoned output value of a current pixel of said image is determined from input error values obtained from all previously halftoned pixels of said image, and further wherein both said output pixel value and said output error value are dependent upon the input error values and an output pixel value of said pixel.

13. A computer software system for executing instructions on a general purpose computer, wherein said instructions comprise a plurality of process modules for halftoning an image, said image comprising a plurality of pixels arranged in a plurality of scan lines, said modules comprising:

a first module for determining a derived input value of a current pixel of said image by summing an input pixel value of said current pixel with an input error value;

a second module for determining said input error value from output error values of all pixels of said image preceding said current pixel;

a third module for determining a halftoned output value for said current pixel from said derived input value; and a fourth module for determining an output error value, both said output value and said output error value being dependent upon the input error value and an input pixel value of said current pixel.

14. A system as claimed in claim 13, wherein said instructions are configured for operation via a computer readable medium, said medium being one of a memory device, a computer, and a computer network.

* * * * *

UNITED STATES PATENT AND TRADEMARK OFFICE
CERTIFICATE OF CORRECTION

PATENT NO. : 6,108,452

DATED : August 22, 2000

INVENTOR(S) : PETER WILLIAM MITCHELL ILBERY

It is certified that error appears in the above-identified patent and that said Letters Patent is hereby corrected as shown below:

ON THE COVER PAGE:

Under Column [73], Assignees: "Canon Information Systems Research Australia Pty Ltd.; Canon Aptex Inc., both of North Ryde, Australia" should read --Canon Information Systems Research Australia Pty Ltd., North Ryde, Australia; and Canon Aptex Inc., Tokyo, Japan--.

COLUMN 1

Line 36, "colour" should read --colour.--;
Line 42, "red." should read --red,--; and "RGB)," should read --(RGB),--; and
Line 67, "and and" should read --and--.

COLUMN 2

Line 2, "128," should read --128.--.

COLUMN 3

Line 33, "first" should read --a first--.

UNITED STATES PATENT AND TRADEMARK OFFICE
CERTIFICATE OF CORRECTION

PATENT NO.   : 6,108,452

DATED        : August 22, 2000

INVENTOR(S)  : PETER WILLIAM MITCHELL ILBERY

It is certified that error appears in the above-identified patent and that said Letters Patent is hereby corrected as shown below:

COLUMN 4

Line 54, "value" should read --values--;
    Line 63, "(ie." should read --(i.e.,--; and
    Line 66, "(ie." should read --(i.e.,--.

COLUMN 5

Line 1, "includes" should read --included--;
    Line 60, "(ie." should read --(i.e.,--; and
    Line 63, "(ie." should read --(i.e.,--.

COLUMN 6

Line 7, "(ie." should read --(i.e.,--; and
    Line 9, "take" should read --takes--.

COLUMN 7

Line 39, "(ie." should read --(i.e.,--;
    Line 42, "(ie." should read --(i.e.,--;
    Line 49, "FIG.5." should read --FIG.5--;
    Line 64, "scanline," should read --scanline;--; and
    Line 66, "scanline:" should read --scanline;--.

UNITED STATES PATENT AND TRADEMARK OFFICE
CERTIFICATE OF CORRECTION

PATENT NO.   : 6,108,452
DATED        : August 22, 2000
INVENTOR(S)  : PETER WILLIAM MITCHELL ILBERY Page 3 of 4

It is certified that error appears in the above-identified patent and that said Letters Patent is hereby corrected as shown below:

COLUMN 8

Line 10, "die" should read --the--;
    Line 40, "an" should read --with an--; and
    Line 54, "permits" should read --permits,--.

COLUMN 9

Line 4, "sequences" should read --sequences,--; and
    Line 7, "(eg." should read --(e.g.,--.

UNITED STATES PATENT AND TRADEMARK OFFICE
CERTIFICATE OF CORRECTION

PATENT NO. : 6,108,452

DATED : August 22, 2000

INVENTOR(S) : PETER WILLIAM MITCHELL ILBERY

It is certified that error appears in the above-identified patent and that said Letters Patent is hereby corrected as shown below:

<u>COLUMN 10</u>

Line 40, "defendant" should read --dependent--.

Signed and Sealed this

Twenty-ninth Day of May, 2001

Attest:

NICHOLAS P. GODICI

*Attesting Officer*   *Acting Director of the United States Patent and Trademark Office*